April 15, 1930. H. A. DENMIRE 1,754,502
METHOD OF AND APPARATUS FOR THE MANUFACTURE OF INNER TUBES AND THE LIKE
Filed Nov. 16, 1928 4 Sheets-Sheet 1
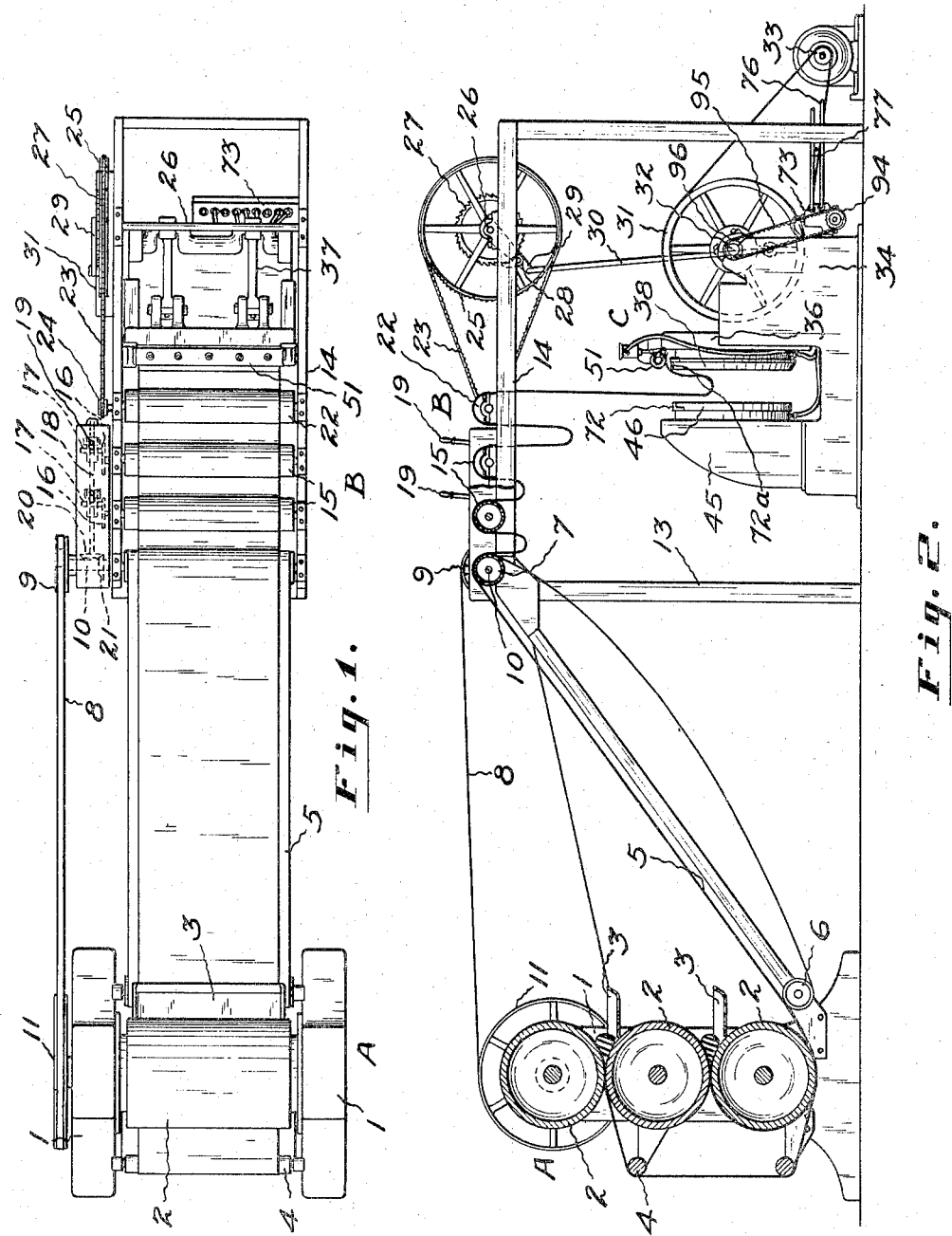
INVENTOR
Harold A. Denmire
BY Evans & McCoy
ATTORNEYS April 15, 1930.  H. A. DENMIRE  1,754,502

METHOD OF AND APPARATUS FOR THE MANUFACTURE OF INNER TUBES AND THE LIKE

Filed Nov. 16, 1928  4 Sheets-Sheet 2

INVENTOR
Harold A. Denmire
BY Evans & McCoy
ATTORNEYS

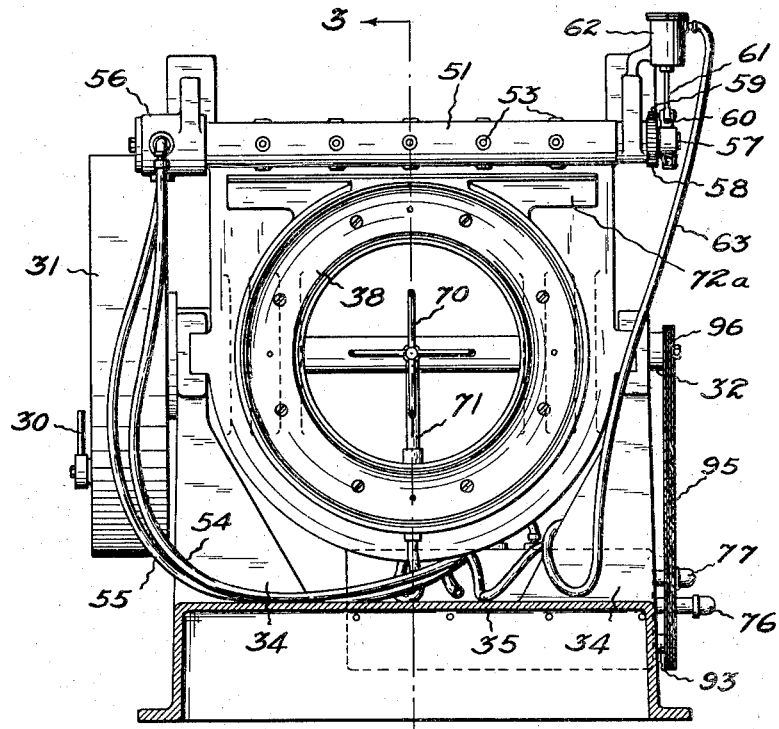
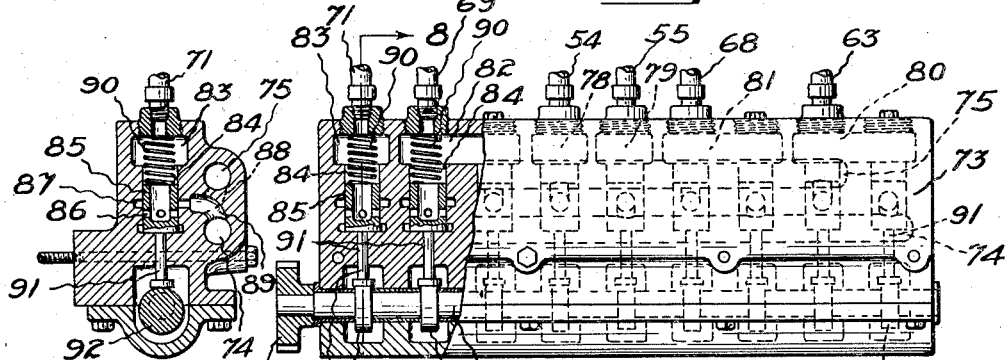
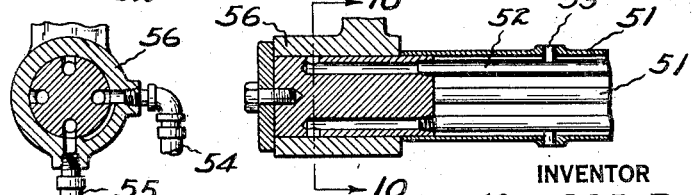

April 15, 1930. H. A. DENMIRE 1,754,502
METHOD OF AND APPARATUS FOR THE MANUFACTURE OF INNER TUBES AND THE LIKE
Filed Nov. 16, 1928 4 Sheets-Sheet 4

INVENTOR
Harold A. Denmire
BY Evans & McCoy
ATTORNEYS

Patented Apr. 15, 1930

1,754,502

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

METHOD OF AND APPARATUS FOR THE MANUFACTURE OF INNER TUBES AND THE LIKE

Application filed November 16, 1928. Serial No. 319,795.

This invention relates to a method of and apparatus for forming inner tubes for pneumatic tires or other hollow rubber tubes of annular form and the invention has for its object to provide a method by which such tubes may be rapidly and economically manufactured.

A further object of the invention is to provide a method by which inner tubes may be formed from a sheet of raw rubber delivered from a continuously operating rubber mill.

A further object is to provide a continuously operating machine associated with rubber mill from which a sheet of raw rubber is continuously delivered and comprising means acting intermittently on the sheet of raw rubber to form the hollow annular tubes.

A further object is to provide a machine which has a festooning device acting in conjunction with cutting and tube forming mechanism, the festooning device and the cutting and forming mechanism acting alternately to dispose the forward end of the sheet in a festoon between the cutting and forming elements and to actuate the cutting and forming mechanism to sever annular pieces of material from the opposite sides of the festoon and to form said annular pieces into a hollow annular tube.

A further object is to provide cutting dies which have annular channeled faces and inner and outer circular cutting edges along the inner and outer sides of the channels, together with means for creating suction in the channels to draw sheet material into the channels and opposed shoulders on the dies for pressing the edges of the annular pieces of raw rubber together to join the same.

A further object is to provide a tube forming machine in which the formed tubes and the excess rubber stock can be readily removed after each tube forming operation.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a top plan view of a machine embodying the invention.

Fig. 2 is a side elevation of the machine.

Fig. 7 is a section taken on the line indicated at 7—7 in Fig. 3.

Fig. 8 is a section taken on the line indicated at 8—8 in Fig. 9.

Fig. 9 is a side elevation of a valve mechanism for controlling suction and pressure to various parts of the tube forming mechanism, a portion of the casing being broken away and shown in section.

Fig. 10 is a section taken on the line indicated at 10—10 in Fig. 11.

Fig. 11 is a fragmentary longitudinal section through one end of the sheet supporting cylinder associated with the tube forming dies.

Figure 3:
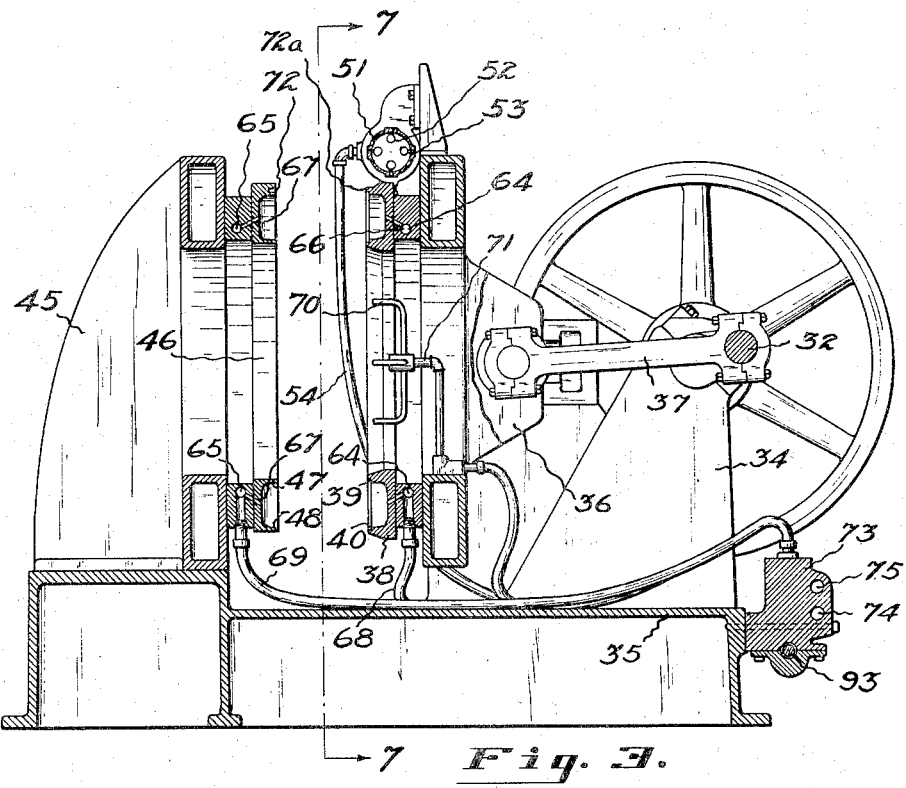
Fig. 3 is a longitudinal vertical section through the tube forming mechanism, taken on the line indicated at 3—3 in Fig. 7.

The present invention consists of a method of forming inner tubes or other annular hollow rubber tubes from a continuously moving sheet of raw rubber delivered from a rubber mill, the tubes being formed at a rate corresponding to the rate of movement of the raw rubber sheet so that a continuous rapid and economical method of manufacturing such tubes is provided.

The machine consists of a rubber mill and delivery mechanism indicated generally by the reference character "A", a festooning mechanism indicated generally by the reference character "B", and a tube forming mechanism indicated generally by the reference character "C".

The rubber is delivered in the form of a sheet from the rubber mill "A" to the festooning mechanism "B," which acts to intermittently form a festoon at the end of the sheet which is suspended between forming dies of the tube forming mechanism "C," the festooning mechanism and the forming mechanism being intermittently operated in timed relation to form an inner tube from the material of each festoon.

The rubber mill consists of upright standards 1 in which are journaled superposed rolls 2 and on which are mounted pans 3 which support masses of raw rubber which are fed between the rolls and delivered in sheet form over guide rollers 4 to an upwardly inclined delivery belt 5, which conveys the sheet to the festooning mechanism. The belt 5 is supported adjacent the lowermost roll 2 upon an idler pulley 6 and its outer end passes over a driven pulley 7. The delivery belt is continuously driven from the rubber mill by means of a drive belt 8 which passes over a pulley 9 fixed to the shaft 10 of the pulley 7 and over a pulley 11 on the shaft of one of the rolls 2.

The outer end of the belt conveyor and the festooning mechanism are supported upon a suitable frame which consists of supporting posts 13 and horizontal top bars 14 in which the shaft 10 is journaled.

Immediately in advance of the delivery end of the belt 5, there are two or more festooning rollers 15 which are journaled at their ends in the supporting bars 14. The shafts of the festooning rollers 15 have friction discs 16 attached thereto at one end and these discs are engaged by friction driving wheels 17 which are slidably keyed to a longitudinal shaft 18 extending along the side of the frame. Levers 19 are provided for shifting the driving wheels 17 along the shaft 18 to engage the discs 16 at various points between the centers and peripheries thereof, the festooning rollers may be driven at varying speeds. The shaft 18 has a bevel gear 20 at one end thereof which meshes with a bevel gear 21 fixed to the shaft 10 so that the festooning rollers 15 are continuously driven at the desired rates of speed with respect to the speed of the belt 5.

Beyond the outer of the rollers 15, there is an additional festooning roller 22 which is operated independently of the rollers 15. The roller 22 is driven by a sprocket chain 23 which passes over a sprocket 24 on the shaft of the roller 22 and over a large sprocket 25 on a shaft 26 journaled on the forward end portion of the frame. The shaft 26 has fixed thereto a ratchet 27 which is engaged by a pawl 28 carried by a lever 29 pivoted on the shaft 26. In the operation of the machine, the lever 29 is oscillated about the shaft 26 by means of a connecting rod 30 which is connected eccentrically to a pulley wheel 31 which is fixed to a transverse shaft 32 and which is driven by an electric motor 33. The shaft 26 and sprocket 25 are thus intermittently actuated and drive the festooning roller 22 through the sprocket chain 23, the rotation of the roller 22 being relatively rapid due to the large diameter of the sprocket 25.

The festooning rollers 15 serve to accumulate slack in the sheet of raw rubber passing over them and the festooning roller 22 serves to take up the slack accumulated between the rollers and form a festoon at predetermined intervals between the dies of the forming mechanism. The tube forming mechanism is mounted on a suitable frame beneath the festooning mechanism and the shaft 32 is journaled in standards 34 at one end of said frame. The frame is provided with a horizontal bed 35 extending longitudinally of the machine upon which is mounted a slide 36 which is reciprocated back and forth on the bed by a connecting rod 37 extending from a crank on the shaft 32 to the slide. The slide 36 carries a vertically disposed annular cutter 38 which is of channel form being provided with inner and outer circular flanges 39 and 40 which are provided at their outer ends with cutting edges 41 and 42. Inwardly from the cutting edges 41 and 42 the flanges 39 and 40 are provided with internal shoulders 43 and 44 which form abutments for a purpose which will be hereinafter explained.

Figure 17:
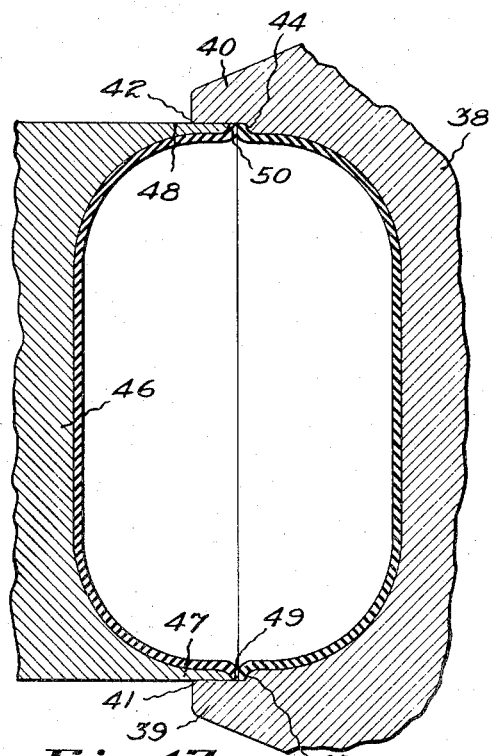
Fig. 17 is an enlarged section through the dies with the dies in engaging position.

Adjacent the forward end thereof, the frame is provided with a standard 45 to which is secured a fixed die 46 which is of annular form and which has inner and outer circular flanges 47 and 48 providing a channel in the face of the die. The flanges 47 and 48 of the fixed die are formed to fit between the outer portions of the flanges 39 and 40 of the movable die 38 and are formed with cutting edges 49 and 50 which coact with the cutting edges 41 and 42 of the movable die to sever annular pieces of sheet material from opposite sides of a festoon supported between the dies, the outer edges of the flanges 47 and 48 providing shoulders opposed to the shoulders 43 and 45 of the movable die so that the edges of the annular pieces of sheet stock cut by the dies are pressed together as shown in Fig. 17 and caused to adhere to form an annular tube.

In order to festoon the sheet between the tube forming dies, means is provided for holding the outer end of the sheet at a fixed elevation while the festooning roller 22 is operated to advance the sheet and form a festoon between the two dies. The sheet holding means is in the form of a cylinder 51 which is mounted on the slide 36 above the annular die 38 and this cylinder is provided with axial air passage-ways 52 extending lengthwise thereof and with rows of openings 53 which are spaced angularly about the circumference of the cylinder, each row registering with one of the passages. Pressure is supplied successively to the passages 52 and air is exhausted from the passages by means of suction and pressure pipes 54 and 55 which are connected to a fixed collar 56 surrounding the cylinder at one end. The cylinder is rotatably mounted so that the passages 52 may be alternately brought into registry with the suction and pressure pipes. The cylinder is provided with a shaft 57 to which is secured a ratchet 58 which is engaged by a pawl 59 carried by a lever 60 which is intermittently actuated to impart a quarter revolution to the cylinder by means of a piston rod 61 which is connected to a piston in the pressure cylinder 62, to which air under pressure is supplied and from which air is exhausted through a single pipe 63. The suction pipe 54 is arranged to exhaust air from the passageway 53 on the side of the cylinder adjacent the suspended sheet material so that the sheet material may be pressed against the cylinder and will be tightly held in engagement therewith by the suction through the openings 53. In the operation of the machine, the end of the sheet depending from the roller 22 is engaged with the suction side of the cylinder 51 and is retained in engagement with the cylinder while the festoon is formed between the forming dies.

The dies 38 and 46 are provided with annular cored passages 64 and 65 back of the channels in their faces and with circumferentially spaced passages 66 and 67 leading from the passages 64 and 65 to the bottoms of the channels and means is provided for alternately connecting the passages 64 and 65 with pressure and suction lines through pipes 68 and 69. Suction is created within the channels of the dies to draw the sheet material into the channels and hold the same against the walls of the channels prior to the cutting operation so that when the edges of the severed annular pieces are brought together between the shoulders 43 and 44 and flanges 47 and 48, as the dies are brought into full engagement, the pieces will engage along the edges only and will be joined together to form an annular tube.

Figures 12, 13, 14, 15:
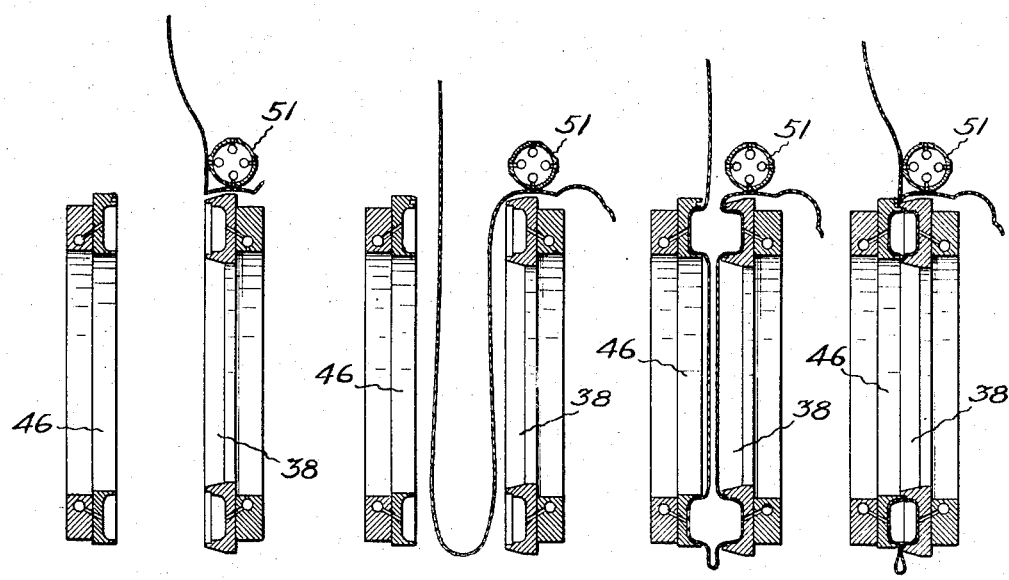
Fig. 12 is a diagrammatic sectional view showing the dies separated to receive between them a festoon of the sheet material.
Fig. 13 is a view similar to Fig. 12 showing the festoon between the dies.
Fig. 14 shows the dies at an intermediate portion of the forming stroke.
Fig. 15 shows the dies at the completion of the forming stroke.

Figs. 12 to 15 of the drawings illustrate the cycle of operations in the formation of an annular rubber tube from the festooned sheet of rubber. Fig. 12 shows the end of the sheet engaged with cylinder 51 at the beginning of the cycle, Fig. 13 shows the festoon formed between the dies and Fig. 14 shows the sheet drawn into the channels of the dies by suction before the material is severed, and Fig. 15 shows the final position of the dies at which time the material is severed and the tube formed.

As the flanges 47 and 48 of the die 46 enter the channel of the die 38, the material on both sides of the festoon is severed by the cutting edges 41, 42, 49 and 50 and the flanges 47 and 48 press the edges of the two severed annular pieces of tacky material against the shoulders 43 and 44 of the die 38, causing said edges to be securely joined throughout the circumference of the tube. The inner cutting edges of the two dies sever circular pieces of material from the sheet within the annular pieces retained in the dies and in order to discharge these pieces when severed from the strip, an air blast device in the form of a spider 70 is provided within the center opening of the movable dies 38, this spider being provided with tubular arms which form blast nozzles which deliver air under pressure against the severed pieces at the completion of the cutting stroke of the dies, air being delivered intermittently to the spider 70 through a pipe 71.

Pressure is admitted to the cylinder 62 just prior to the completion of the cutting stroke of the movable die 38 to give the cylinder 51 a quarter turn, bringing a second row of openings to a position adjacent the depending portion of the rubber sheet above the dies, and the stationary die 46 carries a horizontal cutting edge 72 and the movable die and coacting cutting edge 72$^a$ which extend the full width of the sheet and make a straight cut across the sheet just below the portion of the sheet engaging the suction openings 53 when the dies are brought into engagement with each other. As the movable die is moved away from the stationary die, pressure is admitted through the pipe 55 to the passageway in communication with the openings against which the severed strip is held to blow this strip clear of the cylinder. As the dies separate, the waste material, which may be returned to the rubber mill, is removed and the formed tube is removed from the movable die.

It is necessary that means be provided to control the suction and pressure to the various parts of the machine in the proper sequence and this is accomplished by a valve mechanism in a valve casing 73 mounted at the rear end of the bed 35. This valve casing is provided with longitudinal cored passages 74 and 75 which are connected to pressure and suction pipes 76 and 77. The pipes 54 and 55 leading to the cylinder 51 are connected with chambers 78 and 79 in the casing 73, the pipe 63 leading into the cylinder 62 is connected with the chamber 80 in the casing 73, the pipes 68 and 69 extending to the dies are connected with chambers 81 and 82, and the pipe 71 extending from the suction spider 70 is connected with a chamber 83. Each of the above mentioned chambers is provided with a cylindrical extension forming a valve chamber 84 in which is mounted a hollow cylindrical slide valve 85 which is provided with openings 86 which in one position of the valve register with an annular groove 87 in the wall of the casing. Certain of the valve chambers 84 communicate with the pressure passage 74 through a passage 88 extending from the passage to the groove 87 and other of the valve chambers communicate with the pressure passage 75 through a similar passage 89. Each of the valves 85 is normally held in its lowermost closed position by means of a coil spring 90 and each valve has a downwardly extending stem 91 and these stems are engaged by cams 92 on a cam shaft 93 extending longitudinally of the casing 73 adjacent the bottom thereof.

The shaft 93 is provided at one end with a sprocket 94 and is driven by means of a sprocket chain 95 extending over sprocket 94 and over a sprocket 96 on the crank shaft 32. The cam shaft 93 is thus continuously driven and the cams are so arranged as to admit suction and pressure to the various lines in the proper sequence. All of the valves are normally closed and are opened in the desired sequence by the cams 92.

The chamber 78 with which the pipe 54 communicates is connected with the suction line 75 and the chamber 79 to which the pipe 55 communicates is connected with the pressure line 76 only. The chamber 80 with which the pipe 63 communicates is provided with two of the valves 85 so that this chamber can be alternately connected to the suction and pressure lines to operate the pressure cylinder 62. The chambers 81 and 82 are also connected through valves to both the suction and pressure lines so that suction and pressure can be alternately supplied through the pipes 68 and 69 to the two dies. The chamber 83 with which the pipe 71 communicates is connected to the pressure line only to create a blast through the arms of the spider 70 at the completion of the forming stroke of the movable die to discharge the severed stock from within the die annulus.

In the operation of the machine, the mill is operated until the rubber sheet has been fed over the festooning rollers 15 and 22 until its forward end hangs opposite the holding cylinder 51. This edge is then pressed against the front face of the cylinder and is held to the cylinder by the suction at the openings 53 covered by the sheet. At the completion of the return stroke of the movable die 38, the festooning roller 22 is operated by the ratchet and pawl mechanism actuated from the crank shaft 32 by the connecting rod 31, the roller 22 being rapidly rotated to feed the sheet downwardly between the forming dies, sufficient slack having previously been formed in the sheet between the festooning rollers to supply the material needed to form the festoon between the forming dies 38 and 46. As the die 38 moves toward the stationary die 46, the air passages of both dies are connected with the suction line so that as the annular edges of the dies come into engagement with the sheet, the sheet is drawn into the dies against the walls thereof as shown in Fig. 14 of the drawing.

Figures 4, 5, 6:
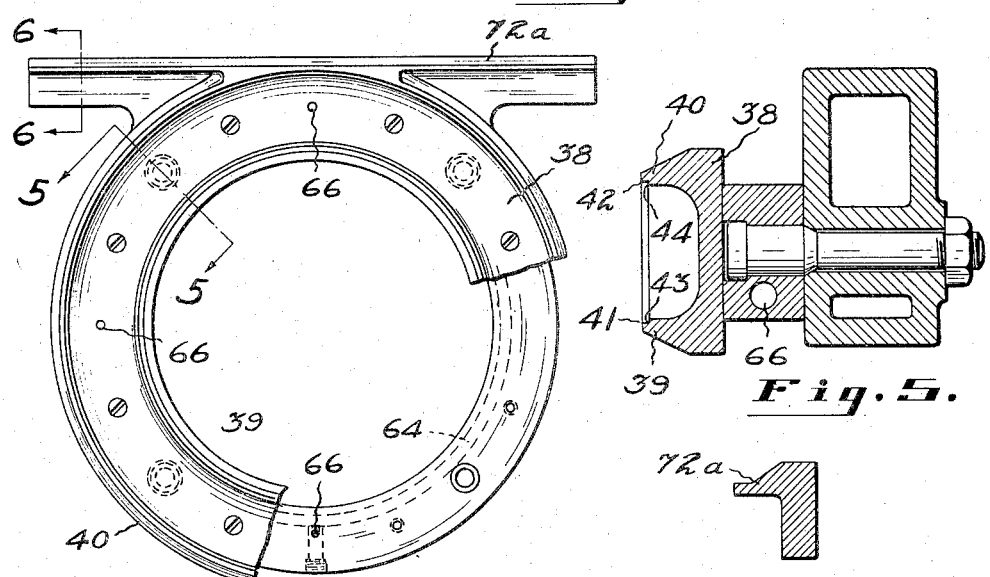
Fig. 4 is a front elevation of the stationary tube forming die.
Fig. 5 is a section taken on the line indicated at 5—5 in Fig. 4.
Fig. 6 is a section taken on the line indicated at 6—6 in Fig. 4.

As the dies approach the position shown in Fig. 13, the cylinder 51 is given a quarter turn to bring an unobstructed row of suction openings to a position facing the sheet and as the dies are brought together as shown in Fig. 5, the sheet is pressed against the suction openings and at the same time the cutting edges 72 and 72$^a$ sever the sheet immediately below the openings. At this time, pressure is admitted to the pipe 55 to blow the severed strip free from the cylinder and pressure is also admitted to the spider 70 to blow the circular pieces of material severed from the sheet out through the central opening of the stationary die 46. As the movable die 38 begins to move away from the stationary die 46, the valves controlling the chamber 82 are operated to close the chamber to the suction line and open the same to the pressure line so that air under pressure is delivered through the pipe 69 to the die 46 to free the tube from the walls of the die.

Suction is maintained in the die 38 for a portion of the return stroke of the die to hold the tube in this die. As the dies move apart, the suction is released from the spider 70 and the material held by the spider together with the strip surrounding the die is removed. Finally, as the movable die approaches its forward position, pressure is admitted to the chamber 81 and through the pipe 68 to the die 38 to free the tube from this die so that it can be removed.

Figure 16:
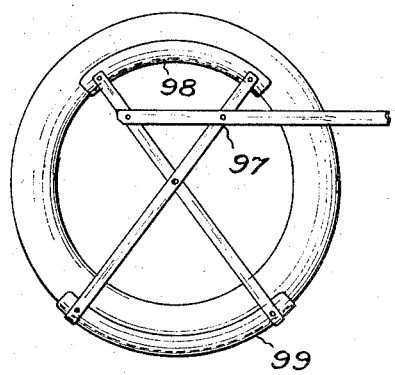
Fig. 16 shows a rack which may be employed for removing the tubes from the machine after they are formed.

A convenient device for removing the tube from the die without collapsing or marring the same is shown in Fig. 16. This device is in the form of a rack 97 carrying arcuate upper and lower supporting pockets 98 and 99 which are adapted to engage the interior and exterior of the annular tube, respectively. The rack is inserted between the dies during the opening stroke with the pockets 98 and 99 in a position to receive the tube from the die 38 and when pressure is admitted to the die 38, the tube is freed from the walls of the die and forced laterally into the pockets 98 and 99, whereupon the rack may be removed with the tire thereon. The excess material severed from the sheet during each tube forming operation may be returned to the rubber mill so that there is no actual waste of material.

It will also be understood that varying degrees of suction or no suction at all can be used in connection with the opposed die members 38 and 46. This is particularly true if the mold members are operated with sufficient speed to pocket a sufficient quantity of air between the opposed portions of the formed tube to prevent the side walls of the tube from sticking together.

It will be apparent that the present invention provides a relatively simple and effective method of continuously producing inner tubes or other similar annular rubber tubes from the sheet material as it is delivered from a rubber mill.

It will further be apparent that no manual handling of the tacky rubber sheet or of the rubber tubes formed in the machine is necessary and that the tubes may be formed very accurately and of a uniform quality.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The herein described method of forming annular rubber tubes which consists in continuously feeding a sheet of raw rubber from a rubber mill, intermittently festooning the sheet, severing annular pieces from the opposite sides of each festoon, forming said pieces and joining the edges thereof to form an annular tube.

2. The herein described method of forming annular rubber tubes which consists in continuously feeding a sheet of raw rubber from a rubber mill, intermittently festooning the sheet, drawing portions of opposite sides of each festoon into the form of annular channels, severing the channeled portions and joining the edges thereof.

3. A machine for making annular tubes comprising a rubber mill for delivering rubber stock in sheet form, a festooning roller over which the sheet is delivered from the mill, means for accumulating slack in the sheet adjacent said roller, tube forming dies beneath the festooning roller, means for reciprocating one of the dies toward and from the other, means above the dies for supporting an end of the sheet, and means for intermittently actuating said roller to festoon the sheet between the dies.

4. A machine for forming endless tubes comprising a pair of opposed dies of channeled form, actuating means for alternately separating and closing the dies, means for continuously feeding a sheet of raw rubber, and means for intermittently festooning the sheet between said forming dies.

5. A machine for forming endless tubes comprising a pair of opposed dies of channeled form, actuating means for alternately separating and closing the dies, a rubber mill, means for conveying the rubber in the form of a continuous sheet from the mill, and means for intermittently festooning the sheet between said forming dies.

6. A machine for forming endless tubes comprising a pair of opposed dies of channeled form, actuating means for alternately separating and closing the dies, a rubber mill for continuously delivering the rubber in sheet form, festooning rollers over which said sheet passes, certain of said rollers being driven from said mill and means for intermittently operating other of said rollers from said die actuating means to festoon the sheet between said dies.

7. A machine for forming endless tubes comprising a pair of opposed dies of channeled form, actuating means for alternately separating and closing the dies, means for supporting a sheet of raw rubber above the dies, and means operated by said actuating means for festooning the sheet between the dies.

8. A tube forming machine comprising a rubber mill for forming a sheet of raw rubber, means for conveying said sheet from the mill including a plurality of festooning rollers, a pair of opposed forming dies mounted below certain of said rollers, mechanism for reciprocating one of said dies into and out of engagement with the other, and driving connections from said mechanism to one of said rollers for intermittently festooning the sheet between the dies.

9. A tube forming machine comprising a rubber mill for forming a sheet of raw rubber, means for conveying said sheet from the mill including a plurality of festooning rollers a pair of opposed forming dies mounted below certain of said rollers, means including a crank shaft for reciprocating one of said dies into and out of engagement with the other, and means connecting said crank shaft and one of said rollers for intermittently actuating the same to festoon the sheet between said dies.

10. A tube forming machine comprising a rubber mill for forming a sheet of raw rubber, means for conveying said sheet from the mill including a plurality of festooning rollers, a pair of opposed forming dies mounted below certain of said rollers, means including a crank shaft for reciprocating one of said dies into and out of engagement with the other, and means including a ratchet and pawl operated from said crank shaft for intermittently rotating one of said rollers to festoon a sheet between said dies.

11. A machine for forming endless tubes comprising a pair of opposed dies having annular channels in their opposed faces, actuating means for alternately separating said dies and closing the same, and means for feeding a sheet of raw rubber and for intermittently festooning the same between said dies.

12. A machine for forming endless tubes comprising a pair of opposed dies having annular channels in their opposed faces, actuating means for alternately separating said dies and closing the same, means for feeding a sheet of raw rubber and for intermittently festooning the same between said dies, and means operable during the closing of the dies for exhausting air from said channels to draw portions of the sheet into engagement with the walls of the channels.

13. A machine for forming endless tubes comprising a pair of opposed dies having annular channels in their opposed faces, actuating means for alternately separating said dies and closing the same, means for feeding a sheet of raw rubber and for intermittently festooning the same between said dies, and means for alternately exhausting air from said channels to draw portions of the sheet into the channels and supplying air under pressure to said channels to free the tube from the dies.

14. A machine for forming endless tubes comprising a pair of opposed dies having annular channels in their opposed faces, actuating means for alternately separating said dies and closing the same, means for feeding a sheet of raw rubber and for intermittently festooning the same between said dies, and an intermittently operating suction device for holding severed portions of the sheet during separation of the dies.

15. A tube forming machine comprising a continuously driven sheet conveyor, a plurality of festooning rollers to which said conveyor delivers, means for continuously driving said rollers and for varying the speed of the individual rollers, an additional festooning roller beyond the continuously driven rollers, means for intermittently driving the latter roller, a member engageable with the end of a sheet to hold the same whereby a festoon is formed upon actuation of the intermittently actuated roller, a pair of opposed dies which are relatively movable into and out of engagement and positioned to receive between them a festoon formed between the intermittently driven roller and holding member, and means for alternately separating said dies and actuating said roller.

In testimony whereof I affix my signature.

HAROLD A. DENMIRE.